United States Patent
Miyazaki

(10) Patent No.: US 7,414,094 B2
(45) Date of Patent: Aug. 19, 2008

(54) RUBBER COMPOSITION FOR INNER LINER

(75) Inventor: Tatsuya Miyazaki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 113 days.

(21) Appl. No.: 11/405,615

(22) Filed: Apr. 18, 2006

(65) Prior Publication Data

US 2006/0270775 A1 Nov. 30, 2006

(30) Foreign Application Priority Data

May 25, 2005 (JP) ............................. 2005-152794

(51) Int. Cl.
*C08L 23/22* (2006.01)
(52) U.S. Cl. ...................... 525/237; 152/511
(58) Field of Classification Search ................. 525/237; 152/511
See application file for complete search history.

(56) References Cited

U.S. PATENT DOCUMENTS 7,259,196 B2 * 8/2007 Suzuki et al. ............... 523/209

FOREIGN PATENT DOCUMENTS

| EP | 1 195 402 A | 4/2002 |
|----|-------------|--------|
| EP | 1 418 199 A1 | 5/2004 |
| EP | 1 479 724 A1 | 11/2004 |
| EP | 1 500 678 A1 | 1/2005 |
| EP | 1 500 678 A9 | 1/2005 |
| JP | 5-17641 A | 1/1993 |
| JP | 10-86604 A | 4/1998 |
| JP | 11-140234 A | 5/1999 |
| JP | 2002-88191 A | 3/2002 |
| JP | 2002-88206 A | 3/2002 |
| JP | 2002-88208 A | 3/2002 |
| JP | 2002-205507 A | 7/2002 |
| JP | 2005-060442 A | 3/2005 |
| WO | WO-01/62846 A1 | 8/2001 |

* cited by examiner

*Primary Examiner*—Robert D. Harlan
(74) *Attorney, Agent, or Firm*—Birch, Stewart, Kolasch & Birch, LLP

(57) ABSTRACT

A rubber composition for an inner liner improving air retention property of a tire, lowering hysteresis loss and further preventing crack growth is provided. A rubber composition for an inner liner comprising 10 to 50 parts by weight of mica having an aspect ratio of at least 50 and an average particle diameter of 40 to 100 μm, based on 100 parts by weight of a rubber component comprising 30 to 60% by weight of butyl base rubber, 20 to 50% by weight of natural rubber or isoprene rubber and 10 to 40% by weight of butadiene rubber.

12 Claims, No Drawings

RUBBER COMPOSITION FOR INNER LINER

BACKGROUND OF THE INVENTION

The present invention relates to a rubber composition for an inner liner.

Tires having low heat generation and a light weight have been recent design goals based on the social desire for a low fuel cost car and a light weight inner liner provided on the inside of a tire. The inner liner is desired to serve the functions of reducing the quantity of air leaks (air permeation quantity) from the inside of a tire with air to the outside and improving air retention properties.

At present, as a rubber composition for an inner liner, the improvement of the air retention property of a tire is obtained by employing butyl base rubber and diene rubber, mainly constituting a butyl base rubber. Butyl base rubber is superior in lowering air permeation, but the hysteresis loss of the rubber composition obtained is large and there have been problems in that the the higher the amount of butyl base rubber used, the greater the heat generation in the tire and the lower the fuel-economy property of the car.

Also, there has been a problem in that when the ratio of natural rubber is increased for improving the fuel-economy property, the quantity of air permeation is also increased.

The Japanese Unexamined Patent Publication No. 11-140234 discloses a rubber composition for an inner liner comprising platy mica. However, the composition does not adequately improve the air retention property of a tire and does not reduce rolling resistance and further, there was a problem in that cracks are generated in the inner liner.

SUMMARY OF THE INVENTION

It is the purpose of the present invention to provide a rubber composition for an inner liner improving air retention property of a tire, lowering hysteresis loss and further preventing crack growth.

The present invention relates to a rubber composition for an inner liner comprising 10 to 50 parts by weight of mica having an aspect ratio of at least 50 and an average particle diameter of 40 to 100 μm, based on 100 parts by weight of a rubber component comprising 30 to 60 % by weight of butyl base rubber, 20 to 50% by weight of natural rubber or isoprene rubber and 10 to 40% by weight of butadiene rubber.

Further, the present invention relates to the rubber composition for an inner liner, further containing at least 4 parts by weight of a plasticizer and 10 to 50 parts by weight of carbon black and/or silica, based on 100 parts by weight of the rubber component.

According to the present invention, the rubber composition for an inner liner, lowering hysteresis loss and improving processability while maintaining air retention properties and crack growth resistance, can be provided by providing a rubber component constituting specific amounts of butyl base rubber, natural rubber or isoprene rubber, and butadiene rubber respectively, and a specific amount of mica having a large aspect ratio and average particle diameter.

DETAILED DESCRIPTION

The rubber composition for an inner liner of the present invention comprises a rubber component and mica.

The rubber component comprises butyl base rubber, natural rubber (hereinafter referred to as NR) or isoprene rubber (hereinafter referred to as IR) and butadiene rubber (hereinafter referred to as BR).

Examples of the butyl base rubber used in the present invention are butyl rubber, brominated butyl rubber, chlorinated butyl rubber and the like. Among these, brominated butyl rubber or chlorinated butyl rubber is preferably used from the viewpoint of improving the vulcanizing speed.

The content of the butyl base rubber in the rubber component is at least 30% by weight, preferably at least 35% by weight. When the content of the butyl base rubber is less than 30% by weight, the air retention property and the crack growth resistance cannot be kept. Also, the content of the butyl base rubber in the rubber component is at most 60% by weight, preferably at most 55% by weight. When the content of the butyl base rubber is more than 60% by weight, tan δ increases and that provides the difficulty of suppressing heat generation of the inner liner.

As NR used in the present invention, RSS#3 and the like which are generally used in the tire industry and the like can be used. Also, as IR used in the present invention, those which are generally used in the tire industry and the like can be similarly used. Among these, NR is preferably used from the viewpoint of increasing the breaking property at low cost.

The content of NR or IR in the rubber component is at least 20% by weight, preferably at least 30% by weight. When the content of NR or IR is less than 20% by weight, the breaking property of the rubber composition become worse. Also, the content of NR or IR in the rubber component is at most 50% by weight, preferably at most 40% by weight. When the content of NR or IR is more than 50% by weight, the air retention property become worse.

As BR, BR150B (available from Ube Industries Ltd.) and the like which are generally used in the tire industry and the like can be used. Among these, BR comprising syndiotactic 1,2-polybutadiene can be preferably used. As BR, concretely, the mixture of high cis BR and high crystalline syndiotactic 1,2-polybutadiene, such as VCR available from Ube Industries Ltd., can be preferably used.

Using BR comprising syndiotactic 1,2-polybutadiene provides high viscosity of non vulcanized rubber composition and excellent productivity when kneading.

The content of syndiotactic 1,2-polybutadiene in BR comprising syndiotactic 1,2-polybutadiene is preferably at least 3% by weight, more preferably at least 5% by weight. When the content of syndiotactic 1,2-polybutadiene is less than 3% by weight, the low content of syndiotactic 1,2-polybutadiene tends to provide low viscosity and low productivity when kneading. Also, the content of syndiotactic 1,2-polybutadiene is preferably at most 25% by weight, more preferably at most 20% by weight. When the content of syndiotactic 1,2-polybutadiene is more than 25% by weight, low dispersibility of polybutadiene resin and low crack growth resistance are tend to be provided.

The content of BR in the rubber component is at least 10% by weight, preferably at least 12% by weight. When the content of BR is less than 10% by weight, crack tends to grow (low crack growth resistance), and the low durability of the inner liner is provided. Also, the content of BR in the rubber component is at most 40% by weight, preferably at most 30% by weight. When the content of BR is more than 40% by weight, low processability by rolling is provided, and that provides the difficulty of milling in a sheet shape without pore.

As mica, at least one member selected from the group consisting of muscovite (white mica), phlogopite (gold mica) and biotite (black mica) can be preferably used. Among these, phlogopite is preferably used from the viewpoint of high effect of air shielding since phlogopite has larger aspect ratio than other mica.

The average particle diameter of mica is at least 40 μm, preferably at least 45 μm. When the average particle diameter of mica is less than 40 μm, the improving effect of the air retention property is insufficient. Also, the average particle diameter of mica is at most 100 μm, preferably at most 70 μm. When the average particle diameter of mica is more than 100 μm, mica is large to be the origination of crack, and an inner liner tends to be cracked by bending fatigue.

Examples of a resin coating the surface of mica are urethane resin, acrylic resin, epoxy resin, nylon resin, polyester resin and the like. Among these, urethane resin, acrylic resin and epoxy resin are preferably used because of high solubility with a rubber. The example of coating method is as followings. First of all, a resin is molten. Secondary, mica is added therein, and the mixture is stirred. Finally, the mixture is pulverized after solidifying the mixture.

The aspect ratio of mica is at least 50, preferably at least 55. When the aspect ratio of mica is less than 50, the improving effect of the air retention property is insufficient. Also, the aspect ratio of mica is preferably at most 100, more preferably at most 70. When the aspect ratio of mica is more than 100, the strength of mica is lowered to generate crack in mica. At this point, the aspect ratio is a ratio of a long diameter of mica to a thickness of mica.

Mica can be obtained by pulverizing methods such as wet pulverization and dry pulverization. Wet pulverization can provide flat surface and slightly high improving of air retention property. Also, dry pulverization has simple production steps, and that provides low cost. As above, respective methods have respective characteristics and be preferably used depending on each case.

The amount of mica is at least 10 parts by weight, preferably at least 30 parts by weight based on 100 parts by weight of the rubber component. When the amount of mica is less than 10 parts by weight, the excellent improving effect of the air retention property, low heat generation property and high crack growth resistance of inner liner cannot be obtained. Also, the amount of mica is at most 50 parts by weight, preferably at most 45 parts by weight, more preferably at most 40 parts by weight based on 100 parts by weight of the rubber component. When the amount of mica is more than 50 parts by weight, crack is easily generated since the tear strength of the rubber composition is lowered.

The rubber composition for an inner liner of the present invention preferably comprises a reinforcing agent further.

As a reinforcing agent, preferably carbon black and/or silica, more preferably carbon black can be used. The rubber composition for an inner liner of the present invention can lower the hysteresis loss and improve the air retention property, the crack growth resistance and the processability, by comprising the specific amount of mica having large aspect ratio based on the rubber component comprising the butyl base rubber, NR or IR and BR and further, additionally comprising the specific amount of carbon black.

As silica, those which are generally used in the tire industry can be used.

The nitrogen adsorption specific surface area of carbon black is preferably 20 to 100 $m^2/g$. When the nitrogen adsorption specific surface area of carbon black is less than 20 $m^2/g$, the reinforcing property to a rubber tends to be low. Also, when the nitrogen adsorption specific surface area of carbon black is more than 100 $m^2/g$, the hardness of the rubber composition is heightened and the low heat generation property tends to be deteriorated.

The amount of carbon black and/or silica is preferably at least 10 parts by weight, more preferably at least 20 parts by weight based on 100 parts by weight of the rubber component. When the amount of carbon black and/or silica is less than 10 parts by weight, polymer and mica are not adequately dispersed and when the rubber composition is rolled in a sheet shape, pores tend to be generated. Also, the amount of carbon black and/or silica is preferably at most 50 parts by weight, more preferably at most 45 parts by weight based on 100 parts by weight of the rubber component. When the amount of carbon black and/or silica is more than 50 parts by weight, the low heat generation property tends to be deteriorated.

The rubber composition for an inner liner of the present invention preferably comprises a plasticizer further.

As the plasticizer, mineral oils and the like can be concretely used.

The amount of the plasticizer is preferably at least 4 parts by weight, more preferably at least 6 parts by weight based on 100 parts by weight of the rubber component. When the amount of the plasticizer is less than 4 parts by weight, mica tends to be hardly dispersed in a rubber and processability tends to be inferior. Also, the amount of the plasticizer is preferably at most 20 parts by weight, more preferably at most 16 parts by weight based on 100 parts by weight of the rubber component. When the amount of the plasticizer is more than 20 parts by weight, the viscosity of the unvulcanized rubber composition is low and the processability at kneading tends to be inferior.

The rubber composition for an inner liner of the present invention can comprise antioxidants, stearic acid, zinc oxide, vulcanizing agents, vulcanization accelerators and the like which are usually used in the tire industry, in addition to the rubber component, mica, the reinforcing agent and the plasticizer.

The rubber composition for an inner liner of the present invention is used for preparing a tire. The tire can be prepared by a usual method using the rubber composition for an inner liner of the present invention. That is, the rubber composition for an inner liner of the present invention to which the above additives are compounded when necessary is extruded into the shape of the inner liner of a tire before vulcanization and molded by the usual method on a tire forming machine to form unvulcanized tire. The unvulcanized tire is heated and pressurized in a vulcanizer to obtain a vulcanized tire.

EXAMPLES

Hereinafter, the present invention is explained in detail based on Examples, but the present invention is not limited thereto.

The raw materials used in Examples and Comparative Examples are described below.

Butyl base rubber: EXXON CHLOROBUTYL 1068 available from Exxon Chemical Ltd.

BR: BR150B (1,4-high-cis BR) available from Ube Industries Ltd.

BR comprising syndiotactic 1,2-polybutadiene (VCR): VCR 412 (the dispersion of the crystalline syndiotactic 1,2-polybutadiene, and the content of syndiotactic 1,2-polybutadiene: 12% by weight) available from Ube Industries Ltd.

NR: RSS#3

Mica 1: MICA (mica) S-200 HG (the aspect ratio: 55, the average particle diameter: 50 μm) available from Revco Inc.

Mica 2: SERICITE TK-S8 (mica, the aspect ratio: 70, the average particle diameter: 15 μm) available from Forum Co.

Mica 3:. LPK (mica, the aspect ratio: 55, an average particle diameter: 15 μm) available from Forum Co.

Mica 4: W1 (mica, the aspect ratio: 30, the average particle diameter: 15 μm) available from Forum Co.
Clay: "POLYFIL DL" (the aspect ratio: 10) available from J.M.Huber Co. Zinc oxide: GINREI R available from Toho Zinc Co., Ltd.
Antioxidant: NOCRAC 224 (amine-ketone base) available from Ouchi Shinko Chemical Industrial Co., Ltd.
Carbon black: SEAST V (N660, the nitrogen adsorption specific surface area: 27 m$^2$/g) available from Tokai Carbon Co., Ltd.
Insoluble sulfur: SEIMISULFUR (insoluble sulfur by carbon disulfide: at least 60%) available from Nippon Kanryu Industry Co., Ltd.
Aroma oil: PROCESS X-140 available from Japan Energy Co.
Stearic acid: TSUBAKI available from Nihon Oil & Fat Industrial Co., Ltd.
Vulcanization accelerator DM: NOCCELER DM available from Ouchi Shinko Chemical Industrial Co., Ltd.
Vulcanization accelerator NS: NOCCELER NS (N-tert-butyl-2-benzothiazolylsulfenamide) available from Ouchi Shinko Chemical Industrial Co., Ltd.

Examples 1 to 6 and Comparative Examples 1 to 13

(Preparation of Tire for Test)
A rubber component consisting of the butyl base rubber, BR, VCR and NR, mica, carbon black and plastic oil were added according to the amounts shown in Tables 1 and 2. Furthermore, 1 part by weight of an antioxidant, 1.5 parts by weight of stearic acid and 5 parts by weight of zinc oxide based on 100 parts by weight of the rubber component were added and the mixtures were kneaded at 150° C. for 4 minutes using a banbury mixer. Then, 1.67 parts by weight of insoluble sulfur, 1.5 parts by weight of a vulcanization accelerator DM and 1.5 parts by weight of a vulcanization accelerator NS based on 100 parts by weight of the rubber component was added to the kneaded products and kneaded at 80° C. for 4 minutes using a biaxial open roll to obtain unvulcanized rubber compositions. The unvulcanized rubber compositions obtained were rolled (the thickness: 1.5 mm) to a sheet shape with a mold and rubber sheets with a diameter of 90 mm and a thickness of 1 mm were prepared by being vulcanized at 170° C. for 12 minutes.

(Roll Workability)
The kneaded products obtained from banbury mixer in said preparation steps of the tire for test were applied to a heated roll (temperature: 80° C.). Winding on the roll with appropriate adhering property, no existence of pores by being uniformly extruded in a sheet shape with a thickness of 0.8 mm and no generation of burr at the edge of the sheet were visually observed and evaluated as below.
⊚: Superior
○: Good
Δ: Acceptable lowest limit
×: Not acceptable
××: Thoroughly impossible processing (Air Permeation Test)
The air permeation quantities of said rubber sheets were measured in accordance with ASTM D-1434-75M and reciprocal numbers of measured air permeation quantities were respectively calculated. The indexation (air retention index) of the reciprocal numbers was conducted respectively, regarding the reciprocal number of Example 1 as 100. The larger the air retention index is, the superior the air retention property of the rubber sheet is since the air permeation quantity of the rubber sheet lowers.

(Viscoelasticity Test)
Loss tangent tan δ of said rubber sheet at 70° C. was measured using a viscoelasticity spectrometer made by Iwamoto Corporation under the conditions of frequency of 10 Hz, the initial strain of 10% and dynamic strain of 2%. The smaller the value of tan δ is, the better the low heat generation property.

(Crack Growth Test)
Samples were prepared based on JIS K 6260. Secondary, the length of cracks generated was measured after bending crack growth test that the rubber sheets were bent by repeating 70% tension 300,000 times. Then, the reciprocal numbers of the measured values were calculated. Furthermore, the indexation (crack growth resistance index) of the reciprocal numbers was conducted respectively, regarding the reciprocal number of Example 1 as 100. The larger the index is, the more superior the crack growth resistance is.

Test result above is shown in Tables 1 and 2.

TABLE 1

|  | Ex. | | | | | | Com. Ex. | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Composition (parts by weight) | | | | | | | | | | | | |
| Butyl base rubber | 50 | 35 | 50 | 50 | 50 | 50 | 50 | 50 | 50 | 25 | 25 | 50 |
| BR | — | — | 15 | — | — | — | — | — | — | — | — | — |
| VCR | 15 | 40 | — | 15 | 15 | 15 | 15 | 15 | 15 | 15 | 50 | — |
| NR | 35 | 25 | 35 | 35 | 35 | 35 | 35 | 35 | 35 | 60 | 25 | 50 |
| Mica 1 | 35 | 35 | 35 | 50 | 50 | 35 | 5 | 60 | 60 | 60 | 60 | 35 |
| Carbon black | 15 | 15 | 15 | 15 | 30 | 15 | 30 | 15 | 5 | 15 | 15 | 15 |
| Oil | 8 | 8 | 8 | 8 | 8 | 12 | 8 | 8 | 8 | 8 | 8 | 8 |
| Evaluation results | | | | | | | | | | | | |
| Air retention index | 100 | 60 | 95 | 150 | 160 | 80 | 20 | 170 | 160 | 70 | 70 | 100 |
| tan δ | 0.10 | 0.08 | 0.10 | 0.13 | 0.15 | 0.15 | 0.15 | 0.16 | 0.15 | 0.16 | 0.16 | 0.10 |
| Crack growth resistance index | 100 | 250 | 120 | 70 | 65 | 150 | 200 | 30 | 20 | 15 | 90 | 5 |
| Processability | ○ | ⊚ | ○ | ○ | ○ | ⊚ | ○ | Δ | X | Δ | ○ | Δ |

TABLE 2

| | Com. Ex. | | | | | | |
|---|---|---|---|---|---|---|---|
| | 7 | 8 | 9 | 10 | 11 | 12 | 13 |
| Composition (parts by weight) | | | | | | | |
| Butyl base rubber | — | — | — | 30 | 30 | 45 | 30 |
| BR | — | — | — | 20 | 20 | — | — |
| VCR | — | — | — | — | — | — | 20 |
| NR | 70 | 70 | 70 | 50 | 50 | 55 | 50 |
| SBR | 30 | 30 | 30 | — | — | — | — |
| Mica 1 | — | — | — | — | 35 | — | — |
| Mica 2 | 30 | — | — | — | — | — | — |
| Mica 3 | — | 35 | — | — | — | — | — |
| Mica 4 | — | — | 30 | — | — | — | — |
| Clay | — | — | — | 100 | — | 200 | 180 |
| Carbon black | 60 | 60 | 60 | 20 | 15 | 20 | 20 |
| Oil | 8 | 8 | 8 | 8 | 8 | 8 | 8 |
| Evaluation results | | | | | | | |
| Air retention index | 95 | 90 | 30 | 50 | 50 | 80 | 120 |
| tanδ | 0.24 | 0.24 | 0.25 | 0.12 | 0.10 | 0.20 | 0.12 |
| Crack growth resistance index | 10 | 20 | 25 | 100 | 120 | 60 | 50 |
| Processability | ○ | ○ | ○ | X | ◎ | XX | X |

What is claimed is:

1. A rubber composition for an inner liner comprising
  10 to 50 parts by weight of mica having an aspect ratio of at least 50 and an avenge particle diameter of 40 to 100 μm,
  based on 100 parts by weight of a rubber component comprising
  30 to 60% by weight of butyl base rubber,
  20 to 50% by weight of natural rubber or isoprene rubber and
  10 to 40% by weight of butadiene rubber.

2. The rubber composition for an inner liner of claim 1, further comprising
  at least 4 parts by weight of a plasticizer and
  10 to 50 parts by weight of carbon black and/or silica,
  based on 100 parts by weight of the rubber component.

3. A tire having an inner liner formed from the rubber composition of claim 1.

4. A tire having an inner liner formed from the rubber composition of claim 2.

5. The rubber composition for an inner liner of claim 1, wherein the mica is present in an amount of 30 to 45 parts by weight based on 100 parts by weight of the rubber.

6. A tire having an inner liner formed from the rubber composition of claim 5.

7. The rubber composition for an inner liner of claim 1, wherein the rubber component comprises
  35 to 55% by weight of butyl base rubber,
  30 to 40% by weight of natural rubber or isoprene rubber and
  12 to 30% by weight of butadiene rubber.

8. A tire having an inner liner formed from the rubber composition of claim 7.

9. The rubber composition for an inner linear of claim 2, wherein the plasticizer is present in an amount of 6 to 20 parts by weight and the carbon black and/or silica is present in an amount of 20 to 45 parts by weight, based on 100 parts by weight of the rubber component.

10. A tire having an inner liner formed from the rubber composition of claim 9.

11. The rubber composition for an inner liner of claim 1, wherein the mica has an aspect ratio of 55 to 100 and an average particle diameter of 45 to 70 μm.

12. A tire having an inner liner formed from the rubber composition of claim 11.

* * * * *